(12) United States Patent
Saggini et al.

(10) Patent No.: US 7,989,982 B2
(45) Date of Patent: Aug. 2, 2011

(54) TRANSMITTING APPARATUS OF DIGITAL SIGNALS ON A SUPPLY LINE OF ELECTRONIC DEVICES AND CORRESPONDING METHOD

(75) Inventors: Stefano Saggini, S. Donato Milanese (IT); Roberto Cappelletti, Cornaredo (IT); Walter Stefanutti, Trasaghis (IT); Paolo Mattavelli, Padua (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1160 days.

(21) Appl. No.: 11/725,183

(22) Filed: Mar. 16, 2007

(65) Prior Publication Data
US 2007/0286305 A1 Dec. 13, 2007

(30) Foreign Application Priority Data
Mar. 17, 2006 (IT) .............................. MI2006A0487

(51) Int. Cl.
*H02J 1/00* (2006.01)
(52) U.S. Cl. .......................................................... 307/77
(58) Field of Classification Search ..................... 307/77
See application file for complete search history.

(56) References Cited

U.S. PATENT DOCUMENTS
7,489,529 B2 * 2/2009 Yang ............................... 363/40
* cited by examiner

*Primary Examiner* — Robert L. DeBeradinis
(74) *Attorney, Agent, or Firm* — Lisa K. Jorgenson; Timothy L. Boller; Seed IP Law Group PLLC

(57) ABSTRACT

A power converter having a noise component and a modulator configured to vary a frequency of the noise component of the power converter on the basis of a digital signal to be transmitted.

24 Claims, 3 Drawing Sheets

TRANSMITTING APPARATUS OF DIGITAL SIGNALS ON A SUPPLY LINE OF ELECTRONIC DEVICES AND CORRESPONDING METHOD

BACKGROUND OF THE INVENTION

1. Field of the Invention

The present disclosure relates to a transmitting apparatus of digital signals on a supply line of electronic devices and corresponding methods.

2. Description of the Related Art

Techniques are known in the prior art for transmitting signals on a power line (PLC, Power Line Communications). One of the most commonly used techniques is based on the use of a dedicated amplifier that is able to inject a signal on the line and a complex signals computer for decoding the information. PLC applications are prevalently telemetry, home automation, indoor Internet access, etc.

In most complex systems, power distribution has a branched pattern in which the supply voltage is initially converted into direct voltage that that is distributed to all the cards and then, through step-down switching DC-DC converters connected to this voltage, the single circuits are supplied. If the geometric distances make the use of cabling for communication between circuits expensive, it is possible to use PLC technology for data transfer.

BRIEF SUMMARY OF THE INVENTION

An embodiment of the present invention simplifies a transmitting apparatus of digital signals on a line in which a supply signal of electronic devices is present. One embodiment comprises at least a switching converter in direct voltage and means suitable for varying the switching frequency of said converter on the basis of a preset digital signal to be transmitted, said converter being suitable for generating an alternating current signal associated with the supply signal during the switching periods, said apparatus comprising further means suitable for receiving said alternating current signal and suitable for processing the latter to obtain said preset digital signal.

One embodiment provides a method for transmitting digital signals.

Embodiments may be advantageously employed to reduce connections and cabling requirements, which may significantly reduce costs. In one embodiment, it is not necessary to use power amplifiers for transmitting information to the power line as the signal is exploited that is generated naturally by the DC-DC converter to transmit information.

In one embodiment, a transmitting apparatus of digital signals on a line in which there is a supply signal, comprises: a direct-voltage switching converter; means for varying the switching frequency of said converter on the basis of a preset digital signal to be transmitted, said converter being suitable for generating an alternating current signal associated with the supply signal during the switching periods; and means for receiving said alternating current signal and suitable for processing the latter to obtain said preset digital signal. In one embodiment, said means for receiving comprises means for the alternating coupling of said alternating current signal, a peak detector, a signal sampler, a low-pass filter and a frequency discriminator suitable for decoding the transmitted digital signal. In one embodiment, the means for varying the switching frequency of the converter uses a first switching frequency for transmitting a "1" and a second switching frequency for transmitting a "0". In one embodiment, said first and second switching frequency are different from a nominal frequency of the converter and said peak detector has an output frequency that is proportional to the difference between said nominal frequency and said first frequency or to the difference between said nominal frequency and said second frequency. In one embodiment, said means for varying the switching frequency of the converter uses a first switching frequency for transmitting a "1" and a second switching frequency for transmitting a "0". In one embodiment, said transmitting apparatus is a PFC of an AC-DC converter, said PFC comprising said DC-DC switching converter including a power transistor and a control circuit of said power transistor, said means adapted to vary the switching frequency of said converter on the base of said preset digital signal being associated with the control circuit of said power transistor.

In one embodiment, a method for transmitting digital signals on a line wherein there is a supply signal of electronic devices, comprises varying the switching frequency of a direct-voltage switching converter on the basis of a preset digital signal to be transmitted, generating an alternating current signal associated with the supply signal during the switching periods, receiving said alternating current signal and processing thereof to obtain said preset digital signal.

In one embodiment, a system comprises: a line configured to provide a power supply signal for a plurality of electronic devices; a transmitting apparatus configured to transmit digital signals on said line wherein said transmitting apparatus comprises: a switching converter; means for varying the switching frequency of said converter on the basis of a preset digital signal to be transmitted, said converter being suitable for generating an alternating current signal associated with the power supply signal during the switching periods; and means for receiving said alternating current signal and for processing the latter to obtain said preset digital signal. In one embodiment, said means for receiving is coupled with a converter of another of the plurality of electronic devices. In one embodiment, said means for receiving comprises means for the alternating coupling of said alternating current signal, a peak detector, a signal sampler, a low-pass filter and a frequency discriminator suitable for decoding the transmitted digital signal. In one embodiment, said means for varying the switching frequency of the converter is configured to generate a first switching frequency for transmitting a "1" and a second switching frequency for transmitting a "0". In one embodiment, said first and second switching frequency are different from a nominal frequency of the converter and said peak detector has an output frequency that is proportional to the difference between said nominal frequency and said first frequency or to the difference between said nominal frequency and said second frequency. In one embodiment, the system comprises an AC-DC converter including a PFC, said PFC comprising said switching converter including a power transistor and a control circuit of said power transistor, said means adapted to vary the switching frequency of said converter on the base of said preset digital signal being associated with the control circuit of said power transistor.

In one embodiment, a transceiver comprises: a switching power converter having a variable switching frequency; a modulator configured to vary the switching frequency of the switching power converter based on a digital signal; and a receiver configured to detect the modulation of the switching frequency to extract the digital signal. In one embodiment, the receiver comprises: a peak detector; a signal sampler; a low-pass filter; and a frequency discriminator. In one embodiment, the modulator is configured to cause the power converter to use a first switching frequency to transmit a one and to cause the power converter to use a second switching frequency to transmit a zero. In one embodiment, the power converter has a nominal switching frequency different from the first and second switching frequencies. In one embodiment, the receiver comprises a second switching power converter.

In one embodiment, a system comprises: a power supply line; a transmitter having: a first power converter having a variable switching frequency and coupled to the power supply line; a modulator configured to vary the switching frequency of the power converter based on a digital signal; and a demodulator coupled to the power supply line and configured to detect the modulation of the switching frequency of the power converter to extract the digital signal. In one embodiment, the system further comprises: an AC-DC converter coupled to the power supply line, wherein the first power converter comprises a DC-DC converter having a transistor and a feedback loop and the modulator is coupled to the feedback loop.

In one embodiment, a method of transmitting a digital signal between a plurality of devices coupled to a power supply line comprises: modulating a switching frequency of a power converter of one of the plurality of devices based on the digital signal; and detecting the modulated switching frequency. In one embodiment, modulating the switching frequency comprises: causing the power converter to use a first switching frequency to transmit a zero; and causing the power converter to use a second switching frequency to transmit a one.

In one embodiment, a method of transmitting a digital signal between a plurality of devices coupled to a power supply line comprises: modulating a feedback signal of a power converter of one of the plurality of devices based on the digital signal; detecting the modulation of the feedback signal; and determining the digital signal based on the detected modulation of the feedback signal. In one embodiment, modulating the feedback signal comprises modulating a duty cycle of the power converter.

In one embodiment, a system comprises: a DC power line; an AC-DC converter having an output coupled to the DC power line; a transmitter having: a DC-DC power converter having a feedback loop and coupled to the power supply line; and a modulator configured to modulate a signal in the feedback loop of the DC-DC power converter based on a digital signal; and a demodulator coupled to the power supply line and configured to detect the modulated signal. In one embodiment, the DC-DC power converter comprises a transistor and an inductor and the feedback loop comprises an error amplifier, wherein the modulator is configured to modulate a duty cycle of the DC-DC power converter.

BRIEF DESCRIPTION OF THE SEVERAL VIEWS OF THE DRAWINGS

The features and the advantages of the embodiments of the present disclosure will become clearer from the following detailed description thereof illustrated by way of non-limiting examples in the attached drawings, in which.

DETAILED DESCRIPTION OF THE INVENTION

Figure 1:
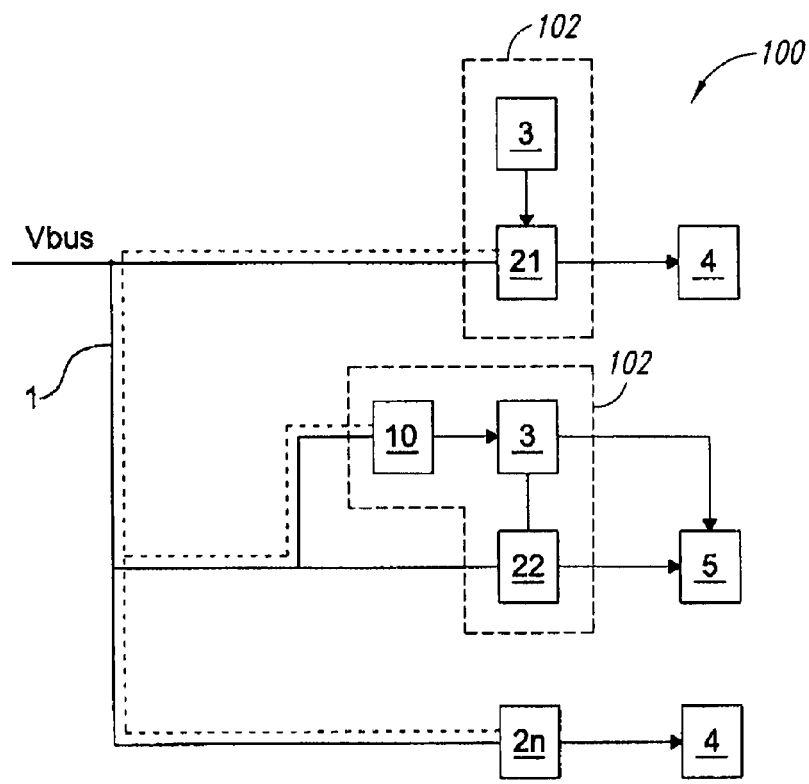
FIG. 1 is a functional block diagram of a system comprising an embodiment of a transmitting apparatus of digital signals according to the present invention.

FIG. 1 shows a system 100 comprising one or more apparatus 102, such as one or more transmitters or transceivers, for transmitting digital signals according to an embodiment of the present invention. The system 100 comprises a supply line or bus 1, along which a direct voltage signal Vbus travels, to which a plurality of electronic devices are connected, as illustrated, a plurality of direct voltage to direct voltage or DC-DC converters 21, 22 . . . 2n of switching type are connected; the line 1 may also be used as a transmission channel. Said apparatus 102 may use the signals existing in normal power conversion without requiring the use of other cables or power amplifiers for the communication. The system 100 may comprise many devices, such as, for example, actuators 4 or sensors 5, each of which may be supplied power by a DC-DC converter, for example, of the synchronous Buck, half bridge, full bridge, forward, etc. type. The DC-DC converters share the same power bus, which can also be used for data transmission.

As is known, the presence of inductance, parasitic resistance and capacitance during switching of the transistors of the converters, may generally create high-frequency dampened oscillations on the power bus 1. The current waves generated by the converter also create an alternating current signal component with an amplitude that depends on the load requirement of the converter and on the resistances on the line. This noise component is sometimes referred to as the switching supply bounce. If the power bus band is sufficiently wide, the signal is propagated along the line. Generally, the spectrum of the noise due to switching is mainly distributed near the switching frequency as well as the high frequency.

An embodiment of the digital signal transmitting apparatus 102 is obtained by modulating the switching frequency fsw of a DC-DC converter to generate an alternating current signal during the converter switching periods and by demodulating the alternating current signal obtained and associated with the supply signal Vbus; the alternating current signal is generated according to a digital signal Dig to be sent, which may be a pre-set digital signal. Thus a switching DC-DC converter is used as a transmitter and the means suitable for piloting said converter, such as a modulator or controller, which is suitable for varying the switching frequency of a DC-DC converter, act as a modulator according to the digital signal Dig to be sent.

Figure 2:
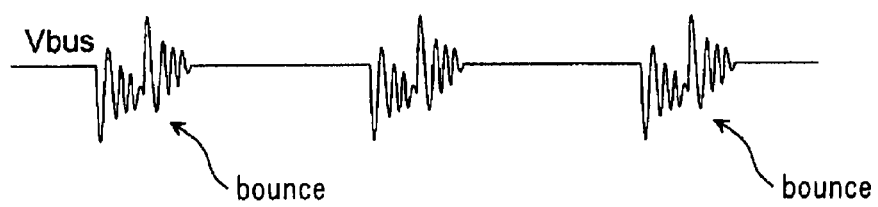
FIG. 2 is a graphical representation of a power supply signal.

One or more of the transmitting apparatus 102 may also comprise means suitable for demodulating the alternating current signal to obtain the associated digital signal Dig. In FIG. 1, 21 indicates the DC-DC switching converter that acts as a transmitter and the piloting means 3 is the modulating means of the signal transmitted on the basis of the digital signal Dig. Also in FIG. 1, the propagation of the alternating current signal is indicated by a dotted line along the line 1. The alternating current signal is demodulated by the means 10 associated with the DC-DC converter 22 and the digital signal Dig obtained from demodulation is used, for example, to command the sensor 5 or the DC-DC converter 22. The signal Vbus with the bounce signal is shown in FIG. 2.

A simple embodiment comprises transmitting in binary mode, using a switching frequency $f_{sw1}$ for transmitting a "1" and a switching frequency $f_{sw0}$ for transmitting a "0", which may both be different from the nominal frequency $f_{swnom}$ of the converter. In order to give more power to the transmitted signal, the DC-DC converter that transmits can introduce, in addition to the aforesaid frequency modulation, also a duty-cycle modulation that enables a current wave to be generated in the power bus. In order not to disturb the adjustment during transmission it is possible for the duty-cycle modulation to occur by imposing on the duty cycle high-frequency oscillation, for example the maximum frequency possible, which is half the switching frequency. Depending on the oscillation amplitude of the duty cycle, we obtain broader transmission and simultaneously a deterioration in converter adjustment performance.

Overall, the signal spectrum on the line contains, if a duty cycle modulation is present, a frequency harmonic equal to $f_{sw}/2$, (where $f_{sw}$ can be $f_{sw0}$, $f_{sw1}$, $f_{swnom}$), a harmonic equal to $f_{sw}$, and the harmonics equal to the multiple of said frequency.

Figure 3:
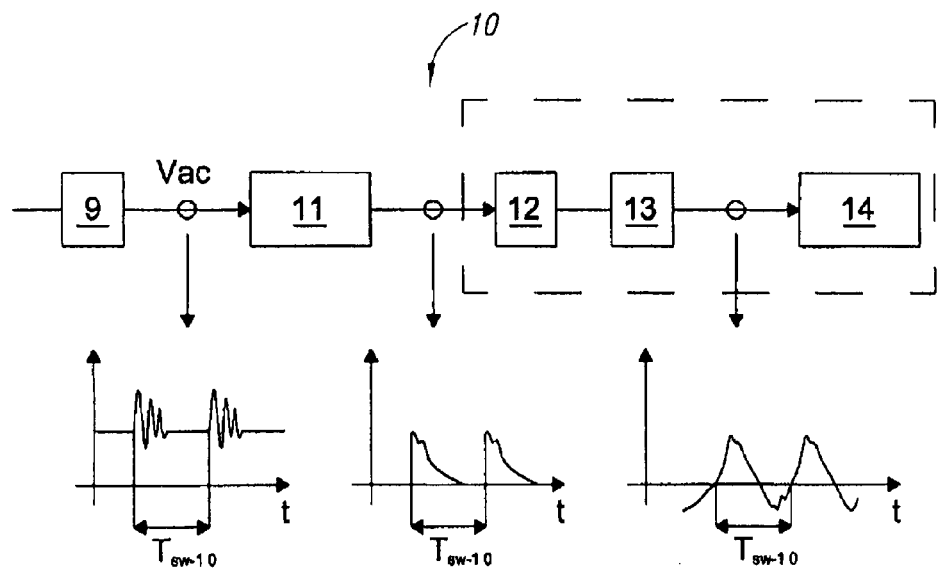
FIG. 3 is a functional block diagram of an embodiment of a demodulator that may be employed by the transmitting apparatus in FIG. 1.

The demodulation of the signal may be obtained through suitable means 10 like the means shown in FIG. 3. In one embodiment, the means comprises means 9 for alternately coupling the bounce signal and obtaining a signal Vac, a peak detector 11 followed by a sampler 12 provided with a low-pass filter 13 and a frequency discriminator 14 that decodes the transmitted information Dig.

The signal on bus 1 is initially coupled with alternating current before being processed by the peak detector 11. The latter adjusts the signal to the nil average value obtained prior to alternating coupling by means, for example, of a circuit 25 in FIG. 4. The circuit 25 comprises a diode D1 the cathode of which is coupled with a resistor R and a capacitor C that are arranged parallel and coupled with a ground GND.

Figure 4:
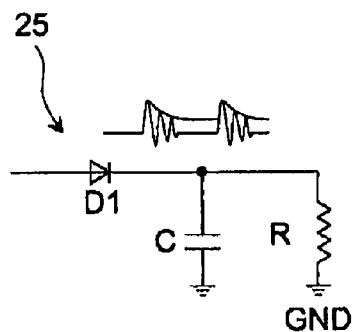
FIG. 4 shows a diagram of an embodiment of a peak detector.

In one embodiment, the time constant $\tau=RC$ present in the circuit in FIG. 4 is sized in such a way that a transient is not exhausted in a switching time Tnom, it is thus imposed that $5\tau$>Tnom. This circuit 24 can be operationally made with many solutions that can be developed through digital technology. An embodiment of a simple non-linear peak detector is shown in FIG. 5.

Figure 5:
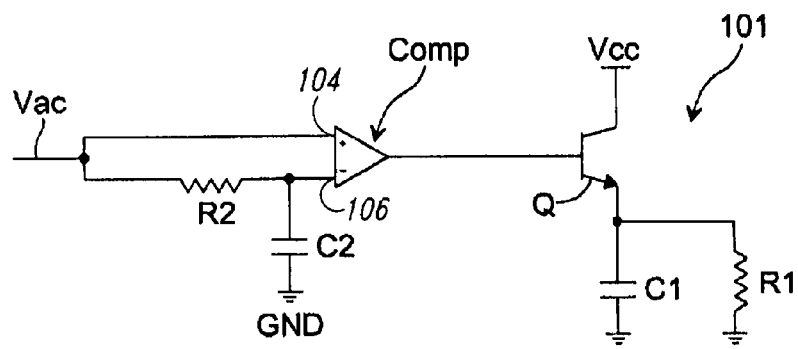
FIG. 5 shows a diagram of another embodiment of a peak detector.

The embodiment of a peak detector shown in FIG. 5 comprises a comparator COMP having an input signal Vac exiting the means 9 and a low-pass filter 101 for filtering the signal exiting the comparator Comp. The comparator Comp has a non-inverting input terminal 104 coupled with the signal Vac and the inverting input terminal 106 coupled with a capacitor c2 connected to ground GND and to a resistor R2 connected to the signal Vac. The filter 101 comprises a bipolar transistor Q having in input to the base terminal the signal in output from the comparator Comp, the collector terminal connected to VDC voltage and the emitter terminal connected to a parallel of a resistor R1 and a capacitor C1 connected to ground GND. In some embodiments, an offset to the input may be created to prevents oscillation of the comparator. Through this technique it is also possible to remove rectification and low-pass filtering using a purely digital apparatus if a clock is available with a frequency that is higher, for example, by at least a factor of ten than the nominal switching frequency. In this case the output digital signal of the comparator Comp may be filtered digitally in such a way as to emulate the behavior of the rectification circuit. With this solution sampling can be achieved without any need for a converter but simply through decimation of the datum.

In one embodiment, a periodic signal exits the peak detector 11 at a frequency that may be half the switching frequency of the transmitting converter, if duty cycle modulations are introduced. The output may also have a double frequency value, when the switch-on and switch-off noises on the line are detected and the duty cycle of the transmitting apparatus is approximately 50%. Lastly, in the remaining cases the frequency of the signal is equal to the switching frequency of the DC-DC transmitting converter. In order to demodulate the signal leaving the peak detector a technique can be selected based on the subsampling obtained through a sample-and-hold 12. The subsampled signal will have a frequency that is equal to the difference between the frequencies $f_{swnom}$ and $f_{sw}$ of the DC-DC transmitting converter 21. Three cases can thus be present in the embodiment.

The output frequency from the peak detector is equal to the switching frequency $f_{sw}$ of the transmitting converter; in this case the subsampling output is a continuous component if no signal is transmitted whilst it is equal to $f_{swnom}-f_{sw1}$ or $f_{swnom}-f_{sw0}$ if a bit 1 or a bit 0 is transmitted.

The output frequency from the peak detector is equal to $f_{sw}/2$ of the frequency of the transmitting converter; in this case the subsampling output is an oscillating signal at the frequency $0.5 f_{sample}$ (where $f_{sample}$ is the actual frequency of the sampler) if nil is not transmitted whilst it is equal to $(f_{sw1}-f_{swnom})/2$ o $(f_{sw0}-f_{swnom})/2$ if a signal 1 or 0 is transmitted.

The output frequency from the peak detector is equal to 2 $f_{sw}$ of the frequency of the transmitting converter; in this case the subsampling output is direct and if no signal is transmitted it is equal to $2 (f_{sw1}-f_{swnom})$ or $2 (f_{sw0}-f_{swnom})$ if a signal 1 or 0 is transmitted.

Thus, owing to the manner in which the peak-detecting apparatus is made, there can be several cases of frequencies detected for the same transmitted information. In order to avoid alias phenomena, the two frequencies $f_{sw1}$ and $f_{sw0}$ may be chosen in such a way that the difference $f_{sw1}-f_{sw}$ and $f_{sw0}-f_{sw}$ are not in the ratio 2 or 4. It should be added that if the frequencies $f_{sw1}$ and $f_{sw0}$ are chosen in such a way that $f_{sw1}-f_{sw}=f_{sw}-f_{sw0}$, in this case, following sampling, the transmission signals have the same frequency but the opposite phase in function of the transmitted value.

At this point a possible method for demodulating the information is based on filtering the signal in such a way as to select the frequencies $(f_{sw1}-f_{swnom})/2$, $(f_{sw0}-f_{swnom})/2$, $f_{swnom}-f_{sw1}$, $f_{swnom}-f_{sw0}$, $2 (f_{sw1}-f_{swnom})$, $2 (f_{sw0}-f_{swnom})$ and cut the frequency zero and the frequency $f_{swnom}/2$. Following filtering the signal can be recovered through a frequency discriminator 14 achieved with a comparator that compares the signal with a threshold and a counter that measures the comparison signal period. For demodulation it is also possible to resort to techniques based on the Fourier transform (FFT, Fast Fourier Transform) of the sampled signal and the discriminator based on the amplitude of the signal present on the transform. The circuits that perform these operations are most naturally achieved by means of a digital signal processing.

Embodiment of the above mentioned method and the apparatus can be applied to converter of different type, as step-up, flyback, sepic converter and generally to each converter providing with an inductance connected with the input voltage. In this case the input current of the converter is constant and does not present a square waveform as that of the above mentioned converters. In this case the carrier to transmit on the line is the current ripple of the inductance; said signal can be amplified by means of the duty cycle modulation or by using an EMI filter with tunable attenuation at this frequency. Said modulation may be made up at each frequency lower than $f_{sw}/2$ so inserting a harmonic at such a frequency in the transmission line.

In this way a PLC technology based on the use of a PFC (Power Factor Corrector) of an AC-DC converter can be formed up. A PFC comprises a electronic component adapted to converter an AC voltage in a DC voltage and a DC-DC converter. The last comprises a converter, for example a step-up converter, including a transistor and an inductance wherein the transistor is driven by means of a feedback control circuit comprising for example an error amplifier, comparators and other components. The modulation of the duty cycle can be obtained by inserting in the control loop the signal to transmit in different ways, that is by inserting it on the reference, by adding it with the control current, etc. The receiver can be one of those of the above-mentioned receivers or can comprise an amplifier with a pass band filter tuned in to transmitted frequencies and connected with a frequency discriminator.

In this case by means of the modulation of the control current of the PFC, it is possible to transmit signals on a line by using the PFC as transmission amplifier.

Figure 6:
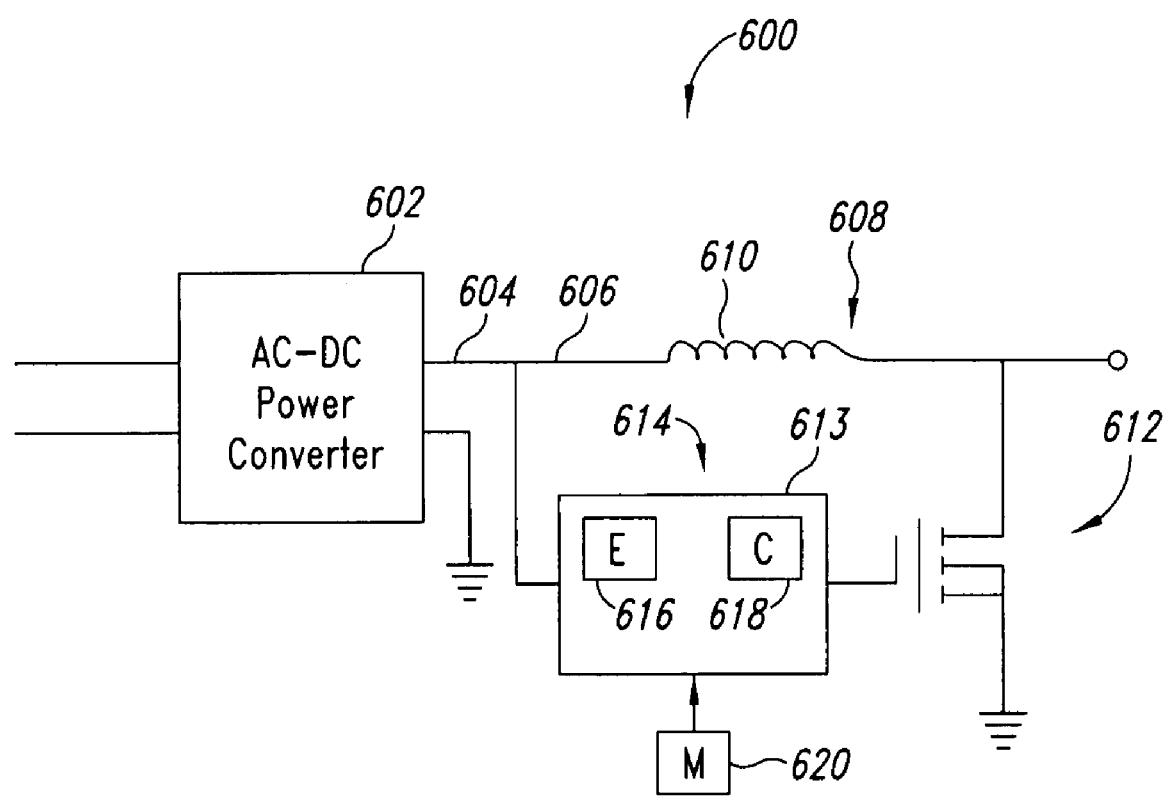
FIG. 6 is a functional block diagram of an embodiment of a system for transmitting digital signals.

FIG. 6 is a functional block diagram of a system 600 configured to transmit a digital signal on a power supply line. The system 600 comprises an AC-DC converter 602 with an output 604 coupled to a DC power line 606, a DC-DC converter 608 coupled to the power line 606. The DC-DC converter 608 comprises an inductor 610, a transistor 612 and a feedback loop 614. The feedback loop 614 comprises a feedback loop controller 613 comprising an error amplifier 616 and a comparator 618. A modulator 620 is coupled to the feedback loop controller 613 and is configured to modulate a feedback control signal based on the digital signal to be transmitted.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A transmitting apparatus of digital signals on a line in which there is a supply signal, comprising:
    a direct-voltage switching converter;
    means for varying the switching frequency of said converter on the basis of a digital signal to be transmitted, said converter being suitable for generating an alternating current signal associated with the supply signal during the switching periods; and
    means for receiving said alternating current signal and suitable for processing the latter to obtain said digital signal.

2. The apparatus according to claim 1, wherein said means for receiving comprises means for the alternating coupling of said alternating current signal, a peak detector, a signal sampler, a low-pass filter and a frequency discriminator suitable for decoding the transmitted digital signal.

3. The apparatus according to claim 2, wherein said means for varying the switching frequency of the converter uses a first switching frequency for transmitting a "1" and a second switching frequency for transmitting a "0".

4. The apparatus according to claim 3, wherein said first and second switching frequency are different from a nominal frequency of the converter and said peak detector has an output frequency that is proportional to the difference between said nominal frequency and said first frequency or to the difference between said nominal frequency and said second frequency.

5. The apparatus according to claim 1, wherein said means for varying the switching frequency of the converter uses a first switching frequency for transmitting a "1" and a second switching frequency for transmitting a "0".

6. The apparatus according to claim 1 wherein said transmitting apparatus is a PFC of an AC-DC converter, said PFC comprising said DC-DC switching converter including a power transistor and a control circuit of said power transistor, said means adapted to vary the switching frequency of said converter on the base of said digital signal being associated with the control circuit of said power transistor.

7. A method for transmitting digital signals on a line wherein there is a supply signal of electronic devices, said method comprising varying a switching frequency of a direct-voltage switching converter on the basis of a digital signal to be transmitted, generating an alternating current signal associated with the supply signal during the switching periods, receiving said alternating current signal and processing thereof to obtain said digital signal.

8. A system, comprising:
    a line configured to provide a power supply signal for a plurality of electronic devices; and
    a transmitting apparatus configured to transmit digital signals on said line wherein said transmitting apparatus comprises:
        a switching converter;
        means for varying the switching frequency of said converter on the basis of a digital signal to be transmitted, said converter being suitable for generating an alternating current signal associated with the power supply signal during the switching periods; and
        means for receiving said alternating current signal and for processing the latter to obtain said digital signal.

9. The system according to claim 8 wherein said means for receiving is coupled with a converter of another of the plurality of electronic devices.

10. The system according to claim 8 wherein said means for receiving comprises means for the alternating coupling of said alternating current signal, a peak detector, a signal sampler, a low-pass filter and a frequency discriminator suitable for decoding the transmitted digital signal.

11. The system according to claim 10 wherein said means for varying the switching frequency of the converter is configured to generate a first switching frequency for transmitting a "1" and a second switching frequency for transmitting a "0".

12. The system according to claim 11, wherein said first and second switching frequency are different from a nominal frequency of the converter and said peak detector has an output frequency that is proportional to the difference between said nominal frequency and said first frequency or to the difference between said nominal frequency and said second frequency.

13. The system according to claim 8, further comprising an AC-DC converter including a PFC, said PFC comprising said switching converter including a power transistor and a control circuit of said power transistor, said means adapted to vary the switching frequency of said converter on the base of said digital signal being associated with the control circuit of said power transistor.

14. A transceiver, comprising:
    a switching power converter having a variable switching frequency;
    a modulator configured to vary the switching frequency of the switching power converter based on a digital signal; and a receiver configured to detect the switching frequency of the power converter and output the digital signal based on the detected switching frequency.

15. The transceiver of claim 14 wherein the receiver comprises:
a peak detector;
a signal sampler;
a low-pass filter; and
a frequency discriminator.

16. The transceiver of claim 14 wherein the modulator is configured to cause the power converter to use a first switching frequency to transmit a one and to cause the power converter to use a second switching frequency to transmit a zero.

17. The transceiver of claim 16 wherein the power converter has a nominal switching frequency different from the first and second switching frequencies.

18. The transceiver of claim 14 wherein the receiver comprises a second switching power converter.

19. A system, comprising:
a power supply line;
a transmitter having:
 a first power converter having a variable switching frequency and coupled to the power supply line; and
 a modulator configured to vary the switching frequency of the first power converter based on a digital signal; and
a demodulator coupled to the power supply line and configured to detect the switching frequency of the first power converter.

20. The system of claim 19, further comprising:
an AC-DC converter coupled to the power supply line, wherein the first power converter comprises a DC-DC converter having a transistor and a feedback loop and the modulator is coupled to the feedback loop.

21. A method of transmitting a digital signal between a plurality of devices coupled to a power supply line, the method comprising:
modulating a feedback signal of a power converter of one of the plurality of devices based on the digital signal;
detecting the modulation of the feedback signal; and
reproducing the digital signal based on the detected modulation of the feedback signal.

22. The method of claim 21 wherein modulating the feedback signal comprises:
modulating a duty cycle of the power converter.

23. A system, comprising:
a DC power line;
an AC-DC converter having an output coupled to the DC power line;
a transmitter having:
 a DC-DC power converter having a feedback loop and coupled to the DC power line; and
 a modulator configured to modulate a signal in the feedback loop of the DC-DC power converter based on a digital signal; and
a demodulator coupled to the DC power line and configured to detect the modulated signal.

24. The system of claim 23 wherein the DC-DC power converter comprises a transistor and an inductor and the feedback loop comprises an error amplifier, wherein the modulator is configured to modulate a duty cycle of the DC-DC power converter.

* * * * *